United States Patent
Masuyama et al.

(10) Patent No.: US 6,876,399 B1
(45) Date of Patent: Apr. 5, 2005

(54) IMAGE SENSING APPARATUS FOR MICROSCOPE

(75) Inventors: Hideyuki Masuyama, Hachioji (JP); Tetsuya Shirota, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/483,521

(22) Filed: Jan. 14, 2000

(30) Foreign Application Priority Data

Jan. 19, 1999 (JP) .......................... 11-010332
Jun. 30, 1999 (JP) .......................... 11-185437
Jan. 12, 2000 (JP) ......................... 2000-003801

(51) Int. Cl.$^7$ .............................. H04N 5/46; H04N 9/64
(52) U.S. Cl. ...................... 348/649; 348/557; 348/650; 348/651; 348/652
(58) Field of Search ............................. 348/557, 649, 348/650, 651, 352, 79, 222.1, 223.1, 65

(56) References Cited

U.S. PATENT DOCUMENTS

| | | | |
|---|---|---|---|
| 4,661,692 A | | 4/1987 | Kawasaki |
| 4,736,241 A | | 4/1988 | Murakami et al. |
| 5,134,662 A | | 7/1992 | Bacus et al. |
| 5,272,521 A | * | 12/1993 | Tatsumi ............... 348/223.1 |
| 5,481,401 A | | 1/1996 | Kita et al. |
| 5,548,661 A | | 8/1996 | Price et al. |
| 5,703,714 A | | 12/1997 | Kojima |
| 5,933,513 A | | 8/1999 | Yoneyama |
| 6,169,816 B1 | * | 1/2001 | Ravkin ................. 382/128 |
| 6,285,398 B1 | * | 9/2001 | Shinsky et al. ......... 348/223.1 |
| 2001/0045506 A1 | | 11/2001 | Masuyama |
| 2003/0016301 A1 | | 1/2003 | Aizaki et al. |

FOREIGN PATENT DOCUMENTS

| | | |
|---|---|---|
| JP | 04-328712 | 11/1992 |
| JP | 06-351027 | 12/1994 |
| JP | 07-199077 A | 8/1995 |
| JP | 08-211295 | 8/1996 |
| JP | 8-237679 | 9/1996 |
| JP | 08-254657 A | 10/1996 |
| JP | 09-102899 A | 4/1997 |
| JP | 10-307262 | 11/1998 |
| JP | 11-084262 | 3/1999 |
| JP | 2000-083184 | 3/2000 |

OTHER PUBLICATIONS

Office Action dated Nov. 7, 2002 in related U.S. Appl. No. 09/912,899, filed Jul. 25, 2001; Inventor: Hideyuki Masuyama.

U.S. Appl. No. 09/203,638, filed Dec. 1, 1998; Inventors: Karaki et al—copy of original application and filing receipt.

* cited by examiner

Primary Examiner—Wendy R. Garber
Assistant Examiner—James M. Hannett
(74) Attorney, Agent, or Firm—Frishauf, Holtz, Goodman & Chick, P.C.

(57) ABSTRACT

An image sensing apparatus for a microscope of this invention includes an image sensing unit for sensing an observation image obtained by a microscope and obtaining the observation image, a microscopy technique determination unit for detecting a microscopy technique in the microscope, a chromaticity determination unit for determining chromaticity of the observation image on the basis of the microscopy technique detected by said microscopy technique determination unit, and determining a region where color balance is adjusted in the observation image, and a color balance adjustment unit for adjusting color balance in accordance with a color balance adjustment amount arbitrarily set for the region of the observation image determined by said chromaticity determination unit.

4 Claims, 7 Drawing Sheets

IMAGE SENSING APPARATUS FOR MICROSCOPE

BACKGROUND OF THE INVENTION

The present invention relates to an image sensing apparatus for a microscope, which senses and displays an observation image obtained from the microscope.

Figure 11:
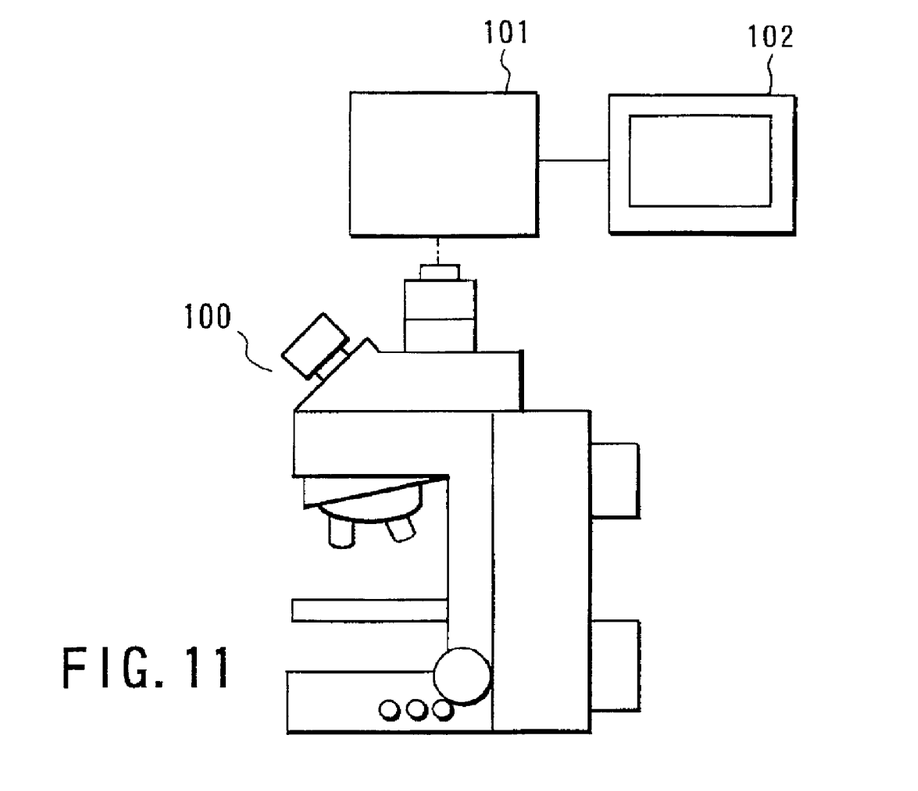
FIG. 11 is a view showing the structure of a conventional image sensing apparatus for a microscope.
Figure 12:
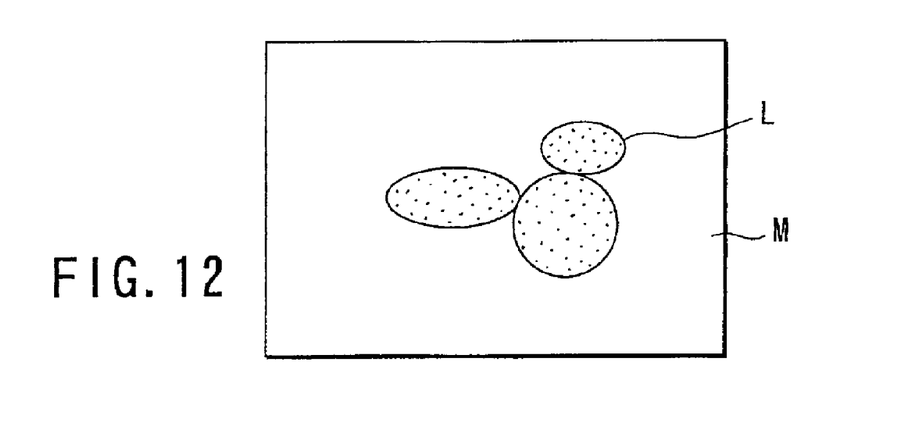
FIG. 12 is a view showing color balance adjustment for an image in transmission bright-field observation in the conventional image sensing apparatus for a microscope.

FIG. 11 is a view showing the schematic structure of a conventional image sensing apparatus for a general microscope. FIG. 12 is a schematic view showing color balance adjustment for an image in transmission bright-field observation by this apparatus.

In FIG. 11, an image sensing apparatus 101 is attached to the observation optical system of a microscope 100, and senses an observation image of a specimen enlarged by the microscope 100. The image sensing apparatus 101 performs photoelectric conversion and the like for the observation image, and displays the observation image data on a display unit 102.

Color balance is generally uniformly adjusted for the entire region of observation image data. For example, the ratio of R (Red), G (Green), and B (Blue) in observation image data is uniformly changed over the entire display region.

When a specimen is observed through the microscope, various microscopy techniques such as transmission bright-field observation and fluorescent observation are selected in accordance with the observation purpose for that specimen. However, upon switching the microscopy technique color balance is not adjusted in consideration of the switched microscopy technique. For example, originally color balance needs to be adjusted only for the stained portion of an observation specimen L in an image in transmission bright-field observation like the one shown in FIG. 12. However, color balance is uniformly adjusted for the entire region of observation image data. As a result, an achromatic background portion M, which need not be colored, is undesirably colored to degrade the image quality.

Correcting observation image data later by image software or the like takes a long time. In addition, the operator must execute an extra operation such as designation of a region subjected to color balance adjustment. This demands an extra labor from the operator.

When a specimen is to be observed through a microscope, the specimen surface is irradiated with a quantity of light appropriate for observation in accordance with the observation conditions of the specimen. At this time, the color temperature of the light source changes depending on adjusting (dimming) of illumination light which irradiates the specimen surface. Hence, to obtain a high-quality color image when an observation image is sensed through the microscope by the image sensing apparatus, white balance must be corrected for the sensed image so as to make the white balance uniform regardless of changes in color temperature of the light source adjusted (dimmed) in accordance with observation conditions.

A known example of a conventional white balance correction method is automatically tracking white balance correction in which color balance prepared by averaging the entire display is corrected to always make it white.

According to another white balance correction, when the color temperature changes with insertion/removal of a filter or changes in light quantity of light source, the stage of the microscope is operated to remove the specimen from the image sensing field, and the entire display is made white. In this state, white balance correction is set. While this white balance correction value is held until next new setting, the observation image is sensed.

However, in the method of setting white balance correction while making the entire display white, the microscope must be operated not to display any specimen image on the display in order to make the entire display white every time the color temperature of the light source changes with insertion/removal of a filter or light adjusting (dimming). This greatly degrades the operator's operability.

This white balance correction assumes that a chromatic signal obtained by averaging the colors of the entire display like a natural image is equivalent to a chromatic signal obtained when the entire display is white. That is, an observation image must contain respective colors on average. However, an observation image in microscopic observation ordinarily contains many magenta components or blue components depending on the specimen to be observed. In many cases, a specimen containing many components of a single color is observed. For example, when a specimen containing many magenta components is to be sensed, white balance correction cancels magenta. Then, the specimen portion fades, and the originally white portion is colored in green.

Still another white balance correction method is disclosed in Jpn. Pat. Appln. KOKAI Publication No. 8-237679. This method adopts a mode in which white balance is corrected automatically following changes in light source or object, and a mode in which white balance is corrected in response to a trigger signal and the current white balance correction state is held until a next trigger is input. In each mode, the white balance correction range is defined by controlling the gains of R and B signals, and white balance is corrected within only this range.

In white balance correction disclosed in Jpn. Pat. Appln. KOKAI Publication No. 8-237679, unnatural fading and coloring by white balance correction can be reduced by defining the gain adjustment range for performing correction. However, the above-described problems still arise in an object containing many components of a single color, like a specimen in microscopic observation.

BRIEF SUMMARY OF THE INVENTION

It is an object of the present invention to provide an image sensing apparatus for a microscope, which can provide a smooth observation environment without demanding any extra labor of an operator in sensing an observation image obtained from the microscope.

An image sensing apparatus for a microscope of this invention comprises an image sensing unit for sensing an observation image obtained by a microscope and obtaining the observation image, a microscopy technique determination unit for detecting a microscopy technique in the microscope, a chromaticity determination unit for determining chromaticity of the observation image on the basis of the microscopy technique detected by the microscopy technique determination unit, and determining a region where color balance is adjusted in the observation image, and a color balance adjustment unit for adjusting color balance in accordance with a color balance adjustment amount arbitrarily set for the region of the observation image determined by the chromaticity determination unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The patent or application file contains at least one drawing executed in color. Copies of this patent or patent application publication with color drawing(s) will be provided by the Office upon request and payment of the necessary fee.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
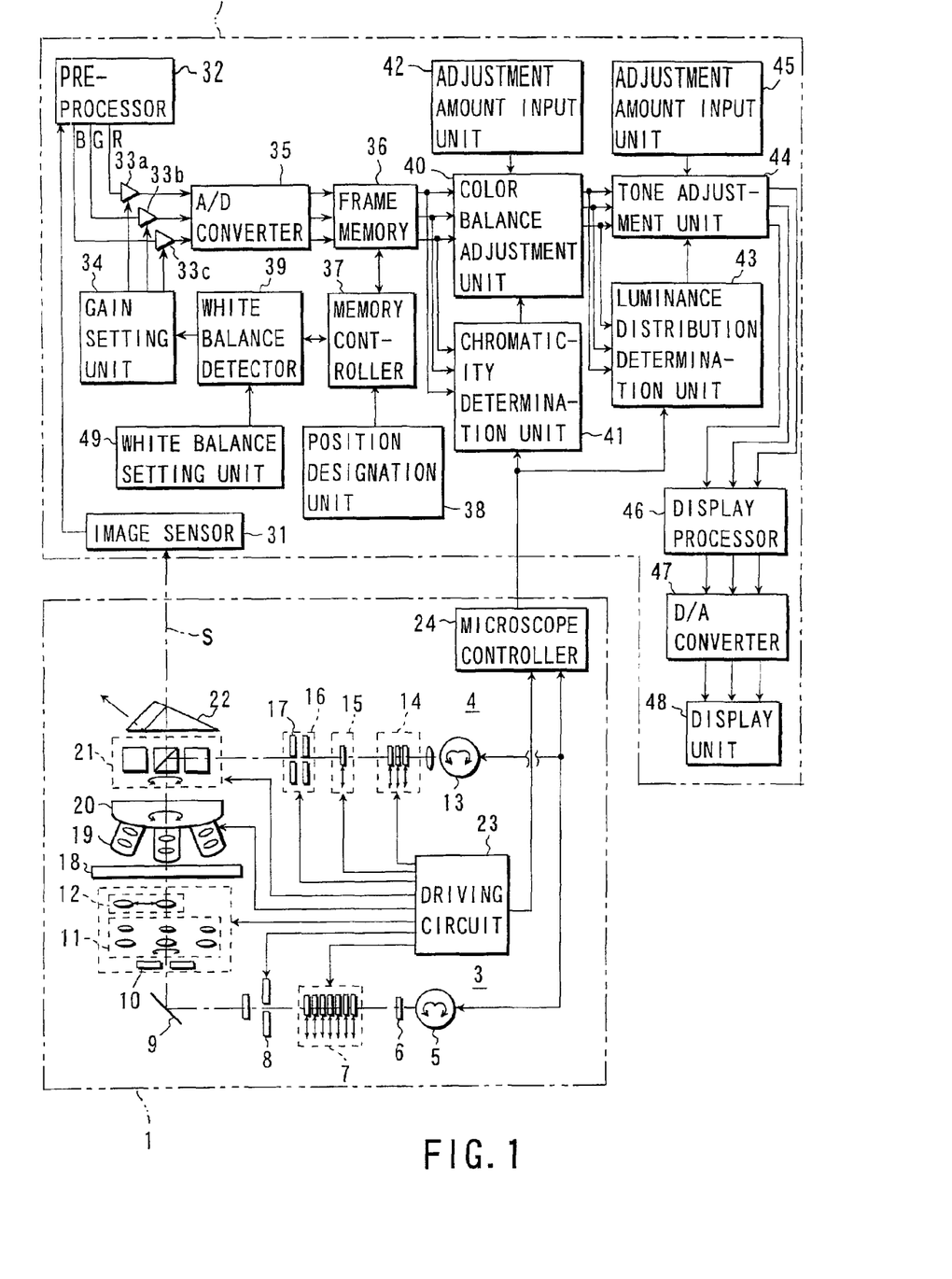
FIG. 1 is a block diagram showing the arrangement of an image sensing apparatus for a microscope according to a first embodiment of the present invention.

FIG. 1 is a block diagram showing the arrangement of an image sensing apparatus for a microscope according to the first embodiment of the present invention. This image sensing apparatus is constituted by a microscope 1 which can be switched to various microscopy techniques such as transmission bright-field observation and fluorescent observation, and image sensing apparatus 2 for sensing an observation image obtained by the microscope 1.

The microscope 1 comprises a transmission observation optical system 3 and incident-light or episcopic observation optical system 4. The transmission observation optical system 3 has a transmission light source 5. A collector lens 6 for collecting transmission light, transmission filter unit 7, transmission field diaphragm (stop) 8, deflecting mirror 9, transmission aperture diaphragm (stop) 10, condenser optical element unit 11, and top lens unit 12 are arranged on the optical path of transmission light emitted by the transmission light source 5. The incident-light observation optical system 4 has an incident light source 13. An incident-light filter unit 14, incident-light shutter 15, incident-light field diaphragm (stop) 16, and incident-light aperture diaphragm (stop) 17 are arranged on the optical path of incident light emitted by the incident light source 13.

A specimen stage 18 on which a specimen to be observed is placed, revolver 20 which has a plurality of objective lenses 19 and revolves to select one objective lens 19 and position it on an observation optical path S, cube unit 21 for switching a dichroic mirror on the observation optical path S in accordance with a microscopy technique such as transmission bright-field observation or fluorescent observation, and beam splitter 22 for splitting the observation optical path S into an eyepiece lens side path and image sensing apparatus side path are inserted on the observation optical path S on which the optical axes of the transmission observation optical system 3 and incident-light observation optical system 4 overlap each other.

The respective units of the transmission observation optical system 3 and incident-light observation optical system 4, specimen stage 18, revolver 20, and cube unit 21 are motorized, and driven by respective motors (not shown) by driving signals from a driving circuit 23.

A microscope controller 24 controls the whole operation of the microscope 1, and is connected to the transmission light source 5, incident light source 13, and driving circuit 23. The microscope controller 24 outputs a control instruction to the driving circuit 23 in accordance with the operation of an operation unit (not shown) by an operator such as switching of the observation magnification, light adjusting (dimming), or switching of the microscopy technique. Further, the microscope controller 24 has a function of adjusting (dimming) the transmission light source 5 and incident light source 13.

The microscope controller 24 has a microscopy technique determination function of receiving from the operator via the operation unit (not shown) an instruction of switching the microscopy technique such as transmission bright-field observation or fluorescent observation, detecting the current microscopy technique, and sending the microscopy technique information to the image sensing apparatus 2. The microscope controller 24 detects the current microscopy technique by detecting a light source in use or a unit driven by the driving circuit 23.

In the image sensing apparatus 2, an image sensor 31 for sensing a color image is located on the observation optical path S of the microscope 1. The image sensor 31 senses the observation image of a specimen enlarged by the microscope 1, and photoelectrically converts the image. The output terminal of the image sensor 31 is connected to a pre-processor 32. The pre-processor 32 has a function of converting an output signal from the image sensor 31 into a video signal, and separating the video signal into signals of respective R (Red), G (Green), and B (Blue) colors.

The R, G, and B color signals separated by the pre-processor 32 are respectively input to variable gain amplifiers 33a, 33b, and 33c. The variable gain amplifiers 33a, 33b, and 33c correct white balance by amplifying the R, G, and B color signals in accordance with the gains set by a gain setting unit 34.

Outputs from the variable gain amplifiers 33a, 33b, and 33c are input to an A/D converter 35 where they are converted into digital signals. The digital signals are input to a frame memory 36 as digital image data. The frame memory 36 stores image data corresponding to one frame of an observation image sensed by the image sensor 31. The frame memory 36 is connected to a memory controller 37, which, in turn, is connected to a position designation unit 38 and white balance detector 39. The white balance detector 39 is connected to the gain setting unit 34 and a white balance setting unit 49. Note that it is also possible to omit the variable gain amplifier 33b and input a G color signal separated by the pre-processor 32 directly to the A/D converter 35. In this case, white balance is corrected by amplifying R and B color signals by the variable gain amplifiers 33a and 33c in accordance with the gains set by the gain setting unit 34.

The memory controller 37 outputs to the frame memory 36 a control signal for writing an image signal from the A/D converter 35 in the frame memory 36, and a control signal for reading out image data stored in the frame memory 36 to a color balance adjustment unit 40 and chromaticity determination unit 41. The position designation unit 38 inputs index data to the frame memory 36 via the memory controller 37, and displays an arrow A in, e.g., an observation image on a display unit 48 shown in FIG. 2. The position designation unit 38 moves the arrow A in the observation image in accordance with the operation of a connected mouse and the like (not shown) by the operator. The operator operates the mouse to move the arrow A, thereby designating the tip portion of the arrow A as a white portion subjected to white balance detection.

The white balance detector 39 receives, from the frame memory 36 via the memory controller 37, image data corresponding to the region of the white portion designated by the operator from the position designation unit 38. Using the image data, the white balance detector 39 detects white balance. Note that the region corresponds to 6×6=36 pixels having the tip of the arrow A as a center. Of course, an arbitrary region of 4×4 pixels, 5×5 pixels, 8×8 pixels, or the like can be properly designated. It is also possible for the operator to use the arrow A as an enlargement/reduction pointer in the observation image and move the arrow A while dragging with the mouse, thereby designating an arbitrary region.

When white balance is good (satisfied), the white balance detector 39 holds the gains of the variable gain amplifiers 33a, 33b, and 33c set in the gain setting unit 34 at that time. When white balance is lost, the white balance detector 39 sets the gains of the variable gain amplifiers 33a, 33b, and 33c set in the gain setting unit 34 in accordance with the detection results of the white balance detector 39 in order to correct the white balance. When white balance is good, the ratio R:G:B of the respective colors output from the variable gain amplifiers 33a, 33b, and 33c is 1:1:1.

Observation image data stored in the frame memory 36 is sent to the color balance adjustment unit 40 and chromaticity determination unit 41 by the memory controller 37. The chromaticity determination unit 41 has a function of receiving microscopy technique information from the microscope controller 24, determining the chromaticity of each pixel of observation image data on the basis of the microscopy technique information, and determining a region subjected to color balance adjustment in units of pixels. The color balance adjustment unit 40 has a function of adjusting color balance for the pixels of the determined region on the basis of the region subjected to color balance adjustment as the determination result of the chromaticity determination unit 41. More specifically, the color balance adjustment unit 40 adjusts the ratio of the respective colors R:G:B. The adjustment amount of the ratio of R:G:B can be changed in accordance with an amount input by the operator from an adjustment amount input unit 42. The color balance adjustment unit 40 is connected to a tone adjustment unit 44 and luminance distribution determination unit 43.

Observation image data having undergone color balance adjustment by the color balance adjustment unit 40 is sent via the tone adjustment unit 44, a display processor 46, and a D/A converter 47 to a display unit 48 which displays an image. The display processor 46 processes input image data into a signal suitable for the display image size and display speed of the display unit 48, and outputs the signal to the D/A converter 47. The display unit 48 displays an observation image converted into an analog signal by the D/A converter 47.

The luminance distribution determination unit 43 has a function of receiving microscopy technique information from the microscope controller 24, calculating the luminance distribution of the respective pixels of observation image data based on the microscopy technique information, and determining a region subjected to tone (contrast) correction in the observation image data from the luminance distribution. The tone adjustment unit 44 has a function of correcting tone (contrast) in accordance with an arbitrarily set tone correction amount for a region subjected to tone correction in observation image data that is determined by the luminance distribution determination unit 43. In this case, the tone correction amount can be changed in accordance with an amount input by the operator from an adjustment amount input unit 45.

Observation image data having undergone tone adjustment by the tone adjustment unit 44 is sent via the display processor 46 and D/A converter 47 to the display unit 48 which displays an image.

A case in which color balance is adjusted in transmission bright-field observation will be explained as the first operation example of the image sensing apparatus for a microscope having the above arrangement. The operator sets the microscopy technique to the transmission bright-field observation method, and sets the observation magnification and the like from an operation unit (not shown) to the microscope controller 24.

When the microscope controller 24 determines that the microscopy technique is set to the transmission bright-field observation method, the controller 24 turns on the transmission light source 5 to a set brightness, and turns off the incident light source 13. The microscope controller 24 issues a control instruction to the driving circuit 23 so as to set the transmission bright-field observation microscopy technique and observation magnification set by the operator.

The driving circuit 23 drives the revolver 20 so as to locate on the observation optical path S an objective lens 19 having the magnification instructed by the microscope controller 24. At the same time, the driving circuit 23 drives the cube unit 21 so as to locate a transmission observation dichroic mirror on the observation optical path S. The driving circuit 23 controls the transmission aperture diaphragm 10, condenser optical element unit 11, and top lens unit 12 to transmission observation settings, and drives the transmission filter unit 7 and transmission field diaphragm 8.

In this state, transmission light emitted by the transmission light source 5 is collected by the collector lens 6, reflected by the deflecting mirror 9 via the transmission filter unit 7 and transmission field diaphragm 8, and irradiates a specimen (not shown) placed on the specimen stage 18 via the transmission aperture diaphragm 10, condenser optical element unit 11, and top lens unit 12. The light transmitted through the specimen is projected as an observation image on the image sensor 31 of the image sensing apparatus 2 via the objective lens 19, cube unit 21, and beam splitter 22.

The image sensor 31 photoelectrically converts the projected observation image, and outputs the electrical signal to the pre-processor 32. The pre-processor 32 converts the electrical signal from the image sensor 31 into a video signal, separates the video signal into R, G, and B color signals, and outputs them. The output signals of the respective R, G, and B colors from the pre-processor 32 are A/D-converted by the A/D converter 35 via the variable gain amplifiers 33a, 33b, and 33c, and sent to the frame memory 36, and stored in it as digital observation image data. The observation image data stored in the frame memory 36 is read out to the chromaticity determination unit 41 and color balance adjustment unit 40 by the memory controller 37.

The chromaticity determination unit 41 receives speculum information sent from the microscope controller 24, and determines chromaticity for each pixel of the observation image data input from the frame memory 36 on the basis of the speculum information. The chromaticity is determined in accordance with whether the signal level of the respective R, G, and B colors and the ratios (R/G) and (B/G) of the luminances of the respective colors satisfy relations (1) to (4):

$$Wr1 < R/G < Wr2 \quad (1)$$

$$Wb1 < B/G < Wb2 \quad (2)$$

$$R > Rth \quad (3)$$

$$B > Bth \quad (4)$$

where Wr1, Wr2, Wb1, and Wb2 are values set for various microscopy techniques. For example, Wr1=0.8, Wr2=1.2, Wb1=0.8, and Wb2=1.2 are values when an achromatic background portion is selected in transmission bright-field observation. Rth and Bth are thresholds for the magnitudes of the R and B signals, respectively, and have, e.g., a value 50% of the maximum amplitude.

The chromaticity determination unit 41 determines chromaticity for each pixel of observation image data using the chromaticity determination relations (1) to (4). When the chromaticity satisfies all the relations (1) to (4), the pixel is determined to be white. By determining chromaticity for all the pixels of observation image data, a white, achromatic portion in observation image data, i.e., the background of an image in transmission bright-field observation is determined. The region corresponding to a background (a white, achromatic portion) is determined as a region to which the color balance adjustment is not performed, and a region or regions other than the above region are determined as a region to be subjected to the color balance adjustment.

The color balance adjustment unit 40 receives information about the region subjected to color balance adjustment as the determination result of the chromaticity determination unit 41, and adjusts the ratio of the respective colors R:G:B for each pixel of the region on the basis of an adjustment amount input by the operator from the adjustment amount input unit 42, thereby adjusting color balance.

In this apparatus, the color balance adjustment amount can be changed based on a value input by the operator through the adjustment amount input unit 42. Alternatively, the determination color of the chromaticity determination unit 41 may be changed through the adjustment amount input unit 42.

Figure 3:
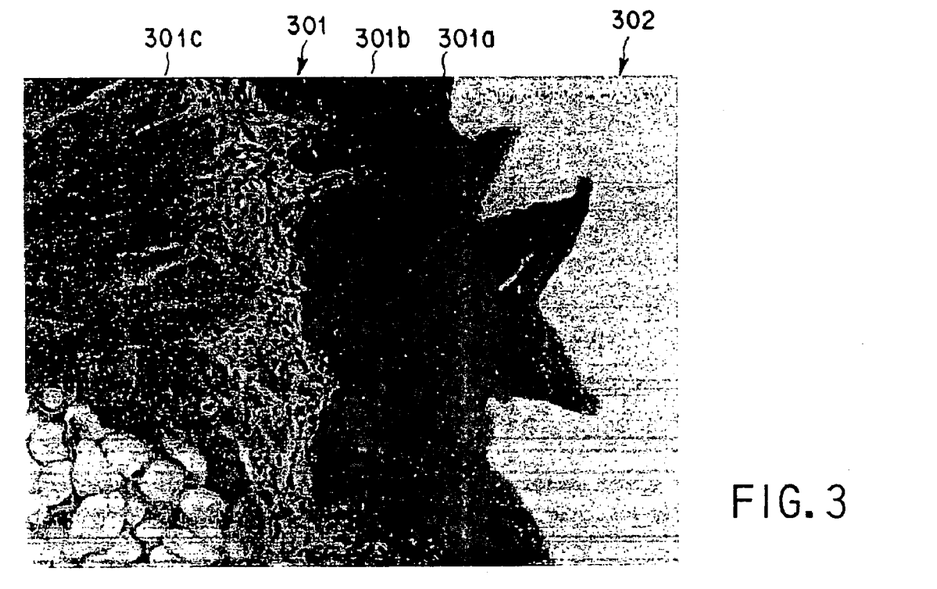
FIG. 3 is a view showing an image sensed and printed in transmission bright-field observation that is displayed on the display unit in the image sensing apparatus for a microscope according to the first embodiment of the present invention.

Observation image data having undergone color balance adjustment by the color balance adjustment unit 40 is sent via the tone adjustment unit 44, display processor 46, and D/A converter 47 to the display unit 48. The display unit 48 displays an image corresponding to the observation image data as shown in FIG. 3. In the first operation example, the luminance distribution determination unit 43 and tone adjustment unit 44 do not process observation image data. In the observation image displayed on the display unit 48, color balance is adjusted for the specimen region 301 but is not adjusted for the achromatic background portion 302. An observation image in FIG. 3 exhibits good color balance at red portions 301a, 301b, 301c, and the like of the specimen.

A case in which color balance is adjusted in fluorescent observation will be explained as the second operation example of the image sensing apparatus for a microscope having the above arrangement. The operator sets the microscopy technique to the fluorescent observation method, and sets the observation magnification and the like from an operation unit (not shown) to the microscope controller 24.

When the microscope controller 24 determines that the microscopy technique (method) is set to the fluorescent observation method, the controller 24 turns on the incident light source 13 to a set brightness, and turns off the transmission light source 5. The microscope controller 24 issues a control instruction to the driving circuit 23 so as to set the fluorescent observation microscopy technique and observation magnification set by the operator.

The driving circuit 23 drives the revolver 20 so as to locate on the observation optical path S an objective lens 19 having the magnification instructed by the microscope controller 24. At the same time, the driving circuit 23 drives the cube unit 21 so as to locate a fluorescent observation dichroic mirror on the observation optical path S. The driving circuit 23 drives the incident-light filter unit 14, incident-light shutter 15, incident-light field diaphragm 16, and incident-light aperture diaphragm 17.

In this state, incident light emitted by the incident light source 13 irradiates a specimen (not shown) placed on the specimen stage 18 via the incident-light filter unit 14, incident-light shutter 15, incident-light field diaphragm 16, incident-light aperture diaphragm 17, fluorescent observation dichroic mirror of the cube unit 21, and objective lens 19. When the specimen is irradiated with incident light, the specimen emits fluorescence. The fluorescence emitted by the specimen is projected as an observation image on the image sensor 31 of the image sensing apparatus 2 via the objective lens 19, cube unit 21, and beam splitter 22.

The image sensor 31 photoelectrically converts the projected observation image, and outputs the electrical signal to the pre-processor 32. The pre-processor 32 converts the electrical signal from the image sensor 31 into a video signal, separates the video signal into R, G, and B color signals, and outputs them. The output signals of the respective R, G, and B colors from the pre-processor 32 are A/D-converted by the A/D converter 35 via the variable gain amplifiers 33a, 33b, and 33c, sent to the frame memory 36, and stored in it as digital observation image data. The observation image data stored in the frame memory 36 is read out to the chromaticity determination unit 41 and color balance adjustment unit 40 by the memory controller 37.

The chromaticity determination unit 41 receives speculum information sent from the microscope controller 24, and determines chromaticity for each pixel of the observation image data input from the frame memory 36 on the basis of the speculum information. The chromaticity determination unit 41 determines chromaticity for each pixel of observation image data based on a predetermined criterion, and determines a black, achromatic region in the observation image data obtained by fluorescent observation. In this case, for example, a value equal to 20% of the maximum amplitude of the signal level is set as the criterion. The region having a signal level smaller than the criterion is determined as a black, achromatic region.

The color balance adjustment unit 40 receives information about the region subjected to color balance adjustment as the determination result of the chromaticity determination unit 41, and adjusts the ratio of the respective colors R:G:B for each pixel of the region on the basis of an adjustment amount input by the operator from the adjustment amount input unit 42, thereby adjusting color balance.

Figure 4:
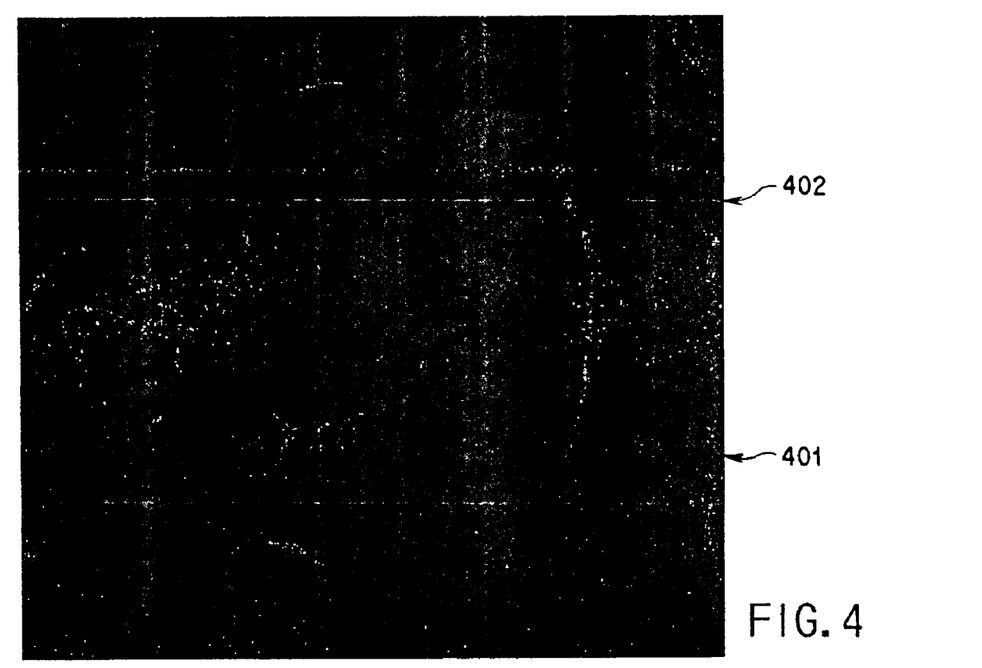
FIG. 4 is a view showing an image sensed and printed in fluorescent observation that is displayed on the display unit in the image sensing apparatus for a microscope according to the first embodiment of the present invention.

Observation image data having undergone color balance adjustment by the color balance adjustment unit 40 is sent via the tone adjustment unit 44, display processor 46, and D/A converter 47 to the display unit 48 which displays an image. The display unit 48 displays an image corresponding to the observation image data as shown in FIG. 4. In the second operation example, the luminance distribution determination unit 43 and tone adjustment unit 44 do not process observation image data. In the observation image displayed on the display unit 48, color balance is adjusted for the specimen region 401 but is not adjusted for the black achromatic portion 402 serving as the background in fluorescent observation. An observation image in FIG. 4 exhibits good color balance at green portions (401), and the like of the specimen.

In the first and second operation examples, the microscopy technique of the microscope 1 is detected by the microscope controller 24, the chromaticity of observation image data is determined by the chromaticity determination unit 41 based on the detected microscopy technique, and a region subjected to color balance adjustment in the observation image data is determined. The determined region of the observation image data undergoes color balance adjustment by the color balance adjustment unit 40 in accordance with a color balance adjustment amount set from the adjustment amount input unit 42.

In transmission bright-field observation, color balance can be selectively adjusted for a portion except for an achromatic background portion in observation image data, i.e., a specimen region. Therefore, while maintaining the color balance (white) of the achromatic background portion, the operator can easily, arbitrarily change color balance only for the stained portion of a specimen under observation. This enables excellent transmission bright-field observation. Also in fluorescent observation, color balance can be adjusted for a specimen region, and is not adjusted for a black, achromatic portion serving as the background. Accordingly, a smooth observation environment corresponding to each microscopy technique can be provided without demanding any extra labor of the operator.

In the first and second operation examples, the criterion for determining chromaticity for each pixel of observation image data is set for each microscopy technique. Instead, a plurality of criteria may be set based on not only the microscopy technique but also filter information, light quantity information, objective lens information, and the like.

The image sensing apparatus shown in FIG. 1 is constituted by the microscope 1 which can be switched to various microscopy techniques such as transmission bright-field observation and fluorescent observation, and image sensing apparatus 2 for sensing an observation image obtained by the microscope 1. In the image sensing apparatus 2, an electrical signal output from the image sensor 31 is converted into a video signal by the pre-processor 32, the video signal is A/D-converted by the A/D converter 35 via the variable gain amplifiers 33a, 33b, and 33c, and then the digital signal is stored as observation image data in the frame memory 36. This observation image data is sent to the luminance distribution determination unit 43 and tone adjustment unit 44 via the color balance adjustment unit 40.

A case in which tone is adjusted in fluorescent observation will be explained as the third operation example of the image sensing apparatus for a microscope having the above arrangement. Note that the basic operation of the microscope 1 in fluorescent observation is the same as in the second operation example. The operator sets the microscopy technique to the fluorescent observation method, and sets the observation magnification from an operation unit (not shown) to the microscope controller 24.

When the microscope controller 24 determines that the microscopy technique is set to the fluorescent method, the controller 24 turns on the incident light source 13 to a set brightness, and turns off the transmission light source 5. In addition, the microscope controller 24 issues a control instruction to the driving circuit 23 so as to set the fluorescent observation method as the designated microscopy technique and the observation magnification.

The driving circuit 23 drives the cube unit 21 so as to enable observation using desired excited light. Further, the driving circuit 23 drives the incident-light filter unit 14, incident-light shutter 15, incident-light field diaphragm 16, and incident-light aperture diaphragm 17.

In this state, incident light emitted by the incident light source 13 irradiates a specimen (not shown) placed on the specimen stage 18 via the incident-light filter unit 14, incident-light shutter 15, incident-light field diaphragm 16, incident-light aperture diaphragm 17, fluorescent observation dichroic mirror of the cube unit 21, and objective lens 19. Upon being irradiated with the incident light, the specimen emits fluorescence. The fluorescence emitted by the specimen is projected as an observation image on the image sensor 31 of the image sensing apparatus 2 via the objective lens 19, cube unit 21, and beam splitter 22.

The image sensor 31 photoelectrically converts the projected observation image, and outputs the electrical signal to the pre-processor 32. The pre-processor 32 converts the electrical signal from the image sensor 31 into a video signal, separates the video signal into R, G, and B color signals, and outputs them. The output signals of the respective R, G, and B colors from the pre-processor 32 are A/D-converted by the A/D converter 35 via the variable gain amplifiers 33a, 33b, and 33c, sent to the frame memory 36, and stored in it as digital observation image data. The observation image data stored in the frame memory 36 is read out to the luminance distribution determination unit 43 and tone adjustment unit 44 via the color balance adjustment unit 40 by the memory controller 37.

The luminance distribution determination unit 43 receives microscopy technique information sent from the microscope controller 24, calculates the luminance distribution of the respective pixels of observation image data input from the frame memory 36 on the basis of the microscopy technique information, and determines a region subjected to tone correction in the observation image data from the luminance distribution.

Determination of the luminance distribution will be described in detail. According to the determination method, a luminance component Y is extracted from the respective R, G, and B colors of observation image data, and a tone correction amount is selected from the luminance component Y. The tone correction amount at this time is set for each microscopy technique by the operator from the adjustment amount input unit 45.

Figure 5:
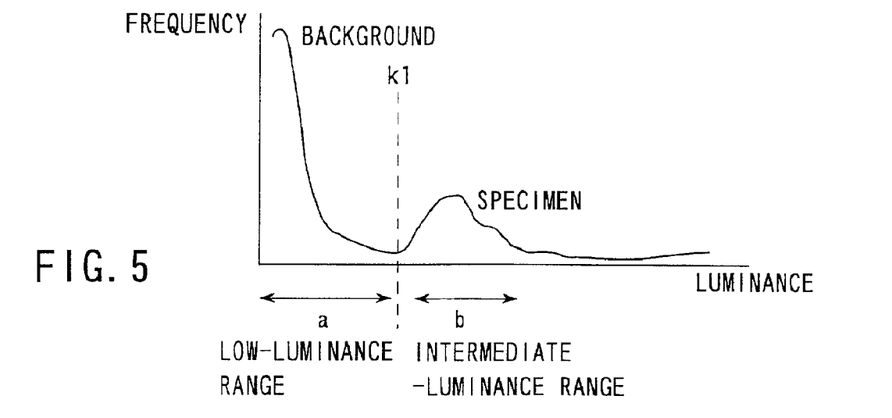
FIG. 5 is a graph showing the luminance distribution of observation image data obtained by a luminance distribution determination unit in the image sensing apparatus for a microscope according to the first embodiment of the present invention.

For example, in the luminance distribution of observation image data in fluorescent observation shown in FIG. 5, a peak appears in a low-luminance range a, and a peak also appears in an intermediate-luminance range b. In this case, the peak in the low-luminance range a is attributed to the pixel value of the background of an observation image, and the peak in the intermediate-luminance range b is attributed to the pixel value of the fluorescence from the specimen.

Figure 6:
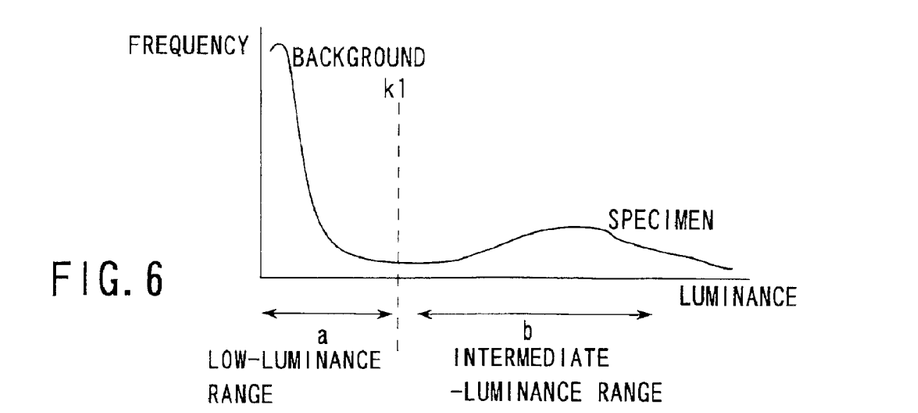
FIG. 6 is a graph showing the result of expanding the tone of an intermediate-luminance range representing the fluorescence of a specimen by a tone adjustment unit in the image sensing apparatus for a microscope according to the first embodiment of the present invention.

To correct tone for such observation image data, a correction amount is selected by which the tone in the intermediate-luminance range b representing the fluorescence of the specimen is expanded without correcting tone in the low-luminance range a. Therefore, the luminance distribution determination unit 43 determines a region subjected to tone correction in observation image data, e.g., the intermediate-luminance range b representing fluorescence of the specimen from the luminance distribution of the observation image data using a luminance k1 as the boundary, as shown in FIGS. 5 and 6.

The tone adjustment unit 44 corrects tone for a region (intermediate-luminance range b) subjected to tone correction in observation image data that is determined by the luminance distribution determination unit 43, in accordance with a tone correction amount input by the operator from the adjustment amount input unit 45. As a result of tone correction, the luminance distribution of observation image data is changed such that tone is not corrected in the low-luminance range a serving as a region where no fluorescence is emitted, and the tone of the intermediate-luminance range b representing the fluorescence of the specimen is expanded, as shown in FIG. 6. The observation image data having undergone tone correction by the tone adjustment unit 44 is output via the display processor 46 and D/A converter 47 to the display unit 48 which displays an image. AS is apparent from FIG. 4, the tone of the intermediate-luminance range (401) representing the fluorescence of the specimen is expanded except for the low-luminance range (402) serving as a region where no fluorescence is emitted.

In the third operation example, the color balance adjustment unit 40 and chromaticity determination unit 41 do not process observation image data. However, an observation image can be displayed in which color balance is adjusted as in the second operation example, and tone is adjusted as in the third operation example.

A case in which tone is adjusted in transmission bright-field observation will be explained as the fourth operation example of the image sensing apparatus for a microscope having the above arrangement. Note that the basic operation of the microscope 1 in transmission bright-field observation is the same as in the first operation example. The operator sets the microscopy technique to the transmission bright-field observation method, and sets the observation magnification from an operation unit (not shown) to the microscope controller 24.

When the microscope controller 24 determines that the microscopy technique is set to the transmission bright-field observation method, the controller 24 turns on the transmission light source 5 to a set brightness, and turns off the incident light source 13. In addition, the microscope controller 24 issues a control instruction to the driving circuit 23 so as to set the transmission bright-field observation method as the designated microscopy technique and the observation magnification.

The driving circuit 23 controls the cube unit 21, transmission aperture diaphragm 10, condenser optical element unit 11, and top lens unit 12 to transmission observation settings, and drives the transmission filter unit 7 and transmission field diaphragm 8.

In this state, transmission light emitted by the transmission light source 5 is collected by the collector lens 6, and irradiates a specimen (not shown) placed on the specimen stage 18 via the transmission filter unit 7, transmission field diaphragm 8, deflecting mirror 9, transmission aperture diaphragm 10, condenser optical element unit 11, and top lens unit 12. The light transmitted through the specimen is projected as an observation image on the image sensor 31 of the image sensing apparatus 2 via the objective lens 19, cube unit 21, and beam splitter 22.

The image sensor 31 photoelectrically converts the projected observation image, and outputs the electrical signal to the pre-processor 32. The pre-processor 32 converts the electrical signal from the image sensor 31 into a video signal, separates the video signal into R, G, and B color signals, and outputs them. The output signals of the respective R, G, and B colors from the pre-processor 32 are A/D-converted by the A/D converter 35 via the variable gain amplifiers 33a, 33b, and 33c, sent to the frame memory 36, and stored in it as digital observation image data. The observation image data stored in the frame memory 36 is read out to the luminance distribution determination unit 43 and tone adjustment unit 44 via the color balance adjustment unit 40 by the memory controller 37.

The luminance distribution determination unit 43 receives microscopy technique information sent from the microscope controller 24, calculates the luminance distribution of the respective pixels of observation image data input from the frame memory 36 on the basis of the microscopy technique information, and determines a region subjected to tone correction in the observation image data from the luminance distribution.

Determination of the luminance distribution will be described in detail. According to the determination scheme, the luminance component Y is extracted from the respective R, G, and B colors of observation image data, and a tone correction amount is selected from the luminance component Y. The tone correction amount at this time is set for each microscopy technique by the operator from the adjustment amount input unit 43.

Figure 7:
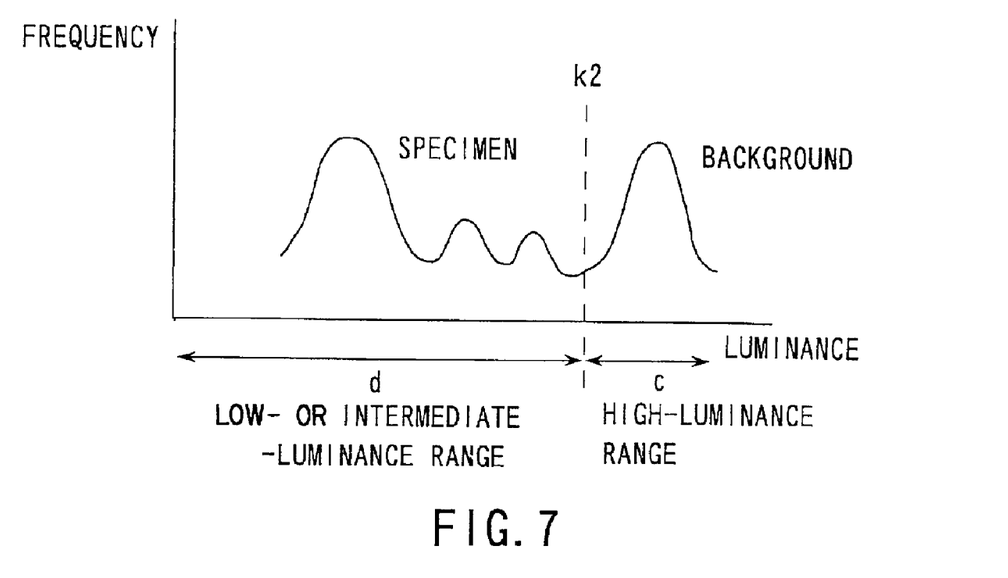
FIG. 7 is a graph showing the luminance distribution of observation image data obtained by the luminance distribution determination unit in the image sensing apparatus for a microscope according to the first embodiment of the present invention.

For example, in transmission bright-field observation shown in FIG. 7, a peak appears in a high-luminance range c, and several peaks appear in a low- or intermediate-luminance range d in the luminance distribution of observation image data. In this case, the peak in the high-luminance range c is attributed to the pixel value of the background of an observation image, and the several peaks in the low- or intermediate-luminance range d are attributed to the pixel values of the stained portion of the specimen.

Figure 8:
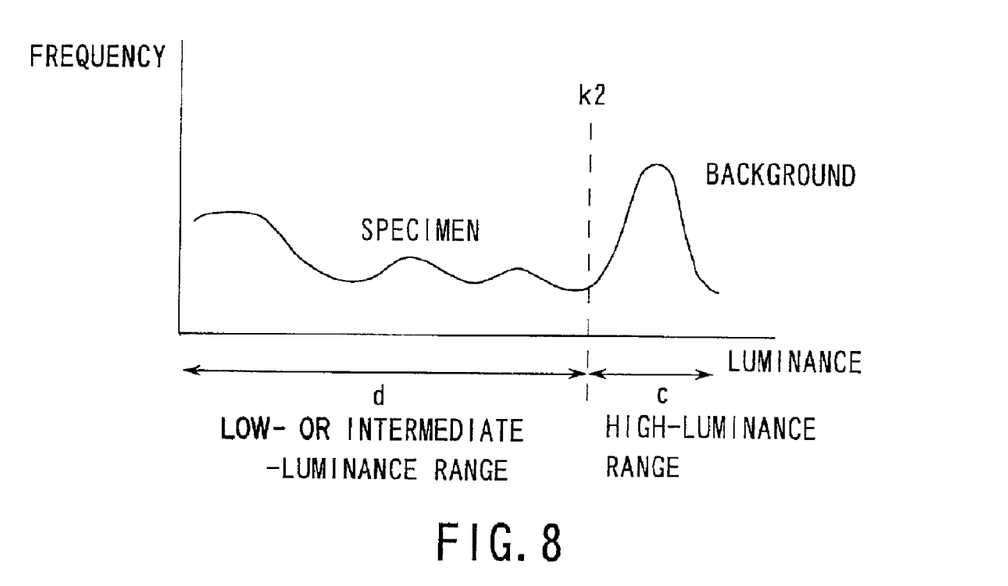
FIG. 8 is a graph showing the result of expanding the tone of a low- or intermediate-luminance range representing the stained portion of a specimen by the tone adjustment unit in the image sensing apparatus for a microscope according to the first embodiment of the present invention.

To correct tone for this observation image data, a correction amount is selected by which the tone in the low- or intermediate-luminance range d representing the stained portion of the specimen is expanded without correcting tone in the high-luminance range c serving as the background of the observation image. Therefore, the luminance distribution determination unit 43 determines a region subjected to tone correction in observation image data, e.g., the low- or intermediate-luminance range d representing the stained portion of the specimen from the luminance distribution of the observation image data using a luminance k2 as the boundary, as shown in FIGS. 7 and 8.

The tone adjustment unit 44 corrects tone for a region (low- or intermediate-luminance range d) subjected to tone correction in observation image data that is determined by the luminance distribution determination unit 43, in accordance with a tone correction amount input by the operator from the adjustment amount input unit 45. As a result of tone correction, the luminance distribution of observation image data is changed such that tone is not corrected in the high-luminance range c representing the background of the observation image, and the tone of the low- or intermediate-luminance range d representing the stained portion of the specimen is expanded, as shown in FIG. 8. The observation image data having undergone tone correction by the tone adjustment unit 44 is output via the display processor 46 and D/A converter 47 to the display unit 48 which displays an image. As is apparent from FIG. 3, the tone of the intermediate-luminance range (301) representing the stained portion of the specimen is expanded except for the high-luminance range (302) representing the background of the observation image.

In the fourth operation example, the color balance adjustment unit 40 and chromaticity determination unit 41 do not process observation image data. However, an observation image can be displayed in which color balance is adjusted as in the first operation example, and tone is adjusted as in the fourth operation example.

In the third and fourth operation examples, the microscopy technique of the microscope 1 is detected by the microscope controller 24, the luminance distribution of observation image data is obtained by the luminance distribution determination unit 43 based on the detected microscopy technique, and a region subjected to tone correction in the observation image data is determined from the luminance distribution. The determined region of the observation image data undergoes tone correction by the tone adjustment unit 44 in accordance with a color balance adjustment amount input from the adjustment amount input unit 45.

In fluorescent observation, tone can be selectively corrected for the intermediate-luminance range b of observation image data subjected to fluorescence observation, i.e., fluorescence from a specimen. The operator can easily and arbitrarily correct tone only for the fluorescence of the specimen to be actually observed except for the low-luminance range a serving as the background which need not be corrected. This enables excellent fluorescent observation.

In transmission bright-field observation, tone can be selectively corrected for the low- or intermediate-luminance range d of observation image data subjected to transmission bright-field observation. The operator can easily and arbitrarily correct tone only for the stained portion of the specimen to be actually observed except for the high-luminance range c serving as the background which need not be corrected. This enables excellent transmission bright-field observation.

Hence, tone can be easily adjusted in accordance with various microscopy techniques such as fluorescent observation and transmission bright-field observation in sensing an observation image from the microscope. A smooth observation environment corresponding to each microscopy technique can be provided without demanding any extra labor from the operator.

A case in which white balance is corrected in transmission bright-field observation will be described as the fifth operation example of the image sensing apparatus for a microscope having the above arrangement. Note that the basic operation of the microscope 1 in transmission bright-field observation is the same as in the first operation example.

When a specimen is observed through the microscope 1, the observation image is projected on the image sensor 31 of the image sensing apparatus 2 and sensed by the image sensor 31. The image sensor 31 photoelectrically converts the projected observation image, and outputs the electrical signal to the pre-processor 32. The pre-processor 32 converts the electrical signal from the image sensor 31 into a video signal, separates the video signal into R, G, and B color signals, and outputs them. The output signals of the respective R, G, and B colors from the pre-processor 32 are input to the variable gain amplifiers 33a, 33b, and 33c where the signals are amplified in accordance with gains set by the gain setting unit 34. The respective color signals from the variable gain amplifiers 33a, 33b, and 33c are input to the A/D converter 35, and converted into digital signals. The digital signals are sent to the frame memory 36, and stored in it as digital image data. The observation image data stored in the frame memory 36 is processed into a signal suitable for the display image size and display speed of the display unit 48 by the display processor 46 via the color balance adjustment unit 40 and the tone adjustment unit 44. The resultant signal is converted into an analog signal by the D/A converter 47, and displayed as an observation image on the display unit 48.

Figure 2:
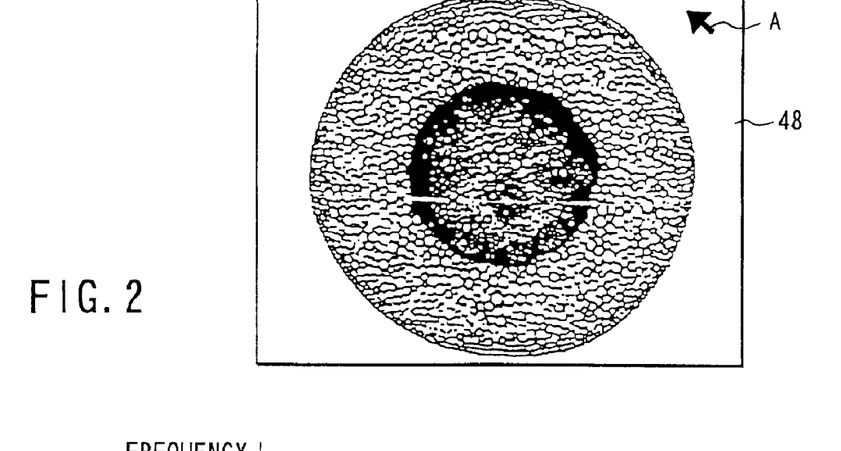
FIG. 2 is a view showing a display example of an observation image on a display unit in the image sensing apparatus for a microscope according to the first embodiment of the present invention.

While the observation image is displayed on the display unit 48, like a display example shown in FIG. 2, the operator inputs index data from the position designation unit 38 to the frame memory 36 via the memory controller 37. More specifically, the operator displays the arrow A in the observation image shown in FIG. 2 with a mouse (not shown) or the like, and designates a white portion subjected to white balance detection with the arrow A.

Then, image data corresponding to the white portion designated by the position designation unit 38 is read out from the frame memory 36 to the white balance detector 39 by the memory controller 37. The white balance detector 39 detects white balance based on the image data.

If white balance is good as a result of detection by the white balance detector 39, (when white balance is good, the R,G and B color signals output from the variable gain amplifiers 33a, 33b, and 33c are 1:1:1 in ratio.) the gains of the variable gain amplifiers 33a, 33b, and 33c set in the gain setting unit 34 are held without any change. If white balance is lost, the gain settings of the variable gain amplifiers 33a, 33b, and 33c are changed by the gain setting unit 34 to correct white balance. When the color temperature of the light source changes upon some operation such as light adjusting performed for the microscope 1, white balance is corrected for the designated white portion following this operation. Since white balance is detected based on image data of a plurality of pixels, white balance can be reliably corrected.

Note that an observation image can be displayed in which white balance is corrected as in the fifth operation example, and color balance is adjusted as in the first operation example. An observation image can also be displayed in which white balance is corrected as in the fifth operation example, and tone is adjusted as in the fourth operation example. Further, an observation image can be displayed in which white balance is corrected as in the fifth operation example, color balance is adjusted as in the first operation example, and tone is adjusted as in the fourth operation example.

In the fifth operation example, the index arrow A is moved within the observation image displayed on the display unit 48 to designate a white portion subjected to white balance detection, and white balance is corrected using image data corresponding to the white portion. Thus, white balance can be reliably and easily corrected not to cause fading of a stained portion or coloring of a white portion in an image even in photographing an image containing many components of specific colors, particularly a single color, such as a microscopic specimen, or in photographing when the color temperature of the light source changes upon light adjusting for properly setting the observation state of the microscope.

A case in which white balance is corrected in transmission bright-field observation will be described as the sixth operation example of the image sensing apparatus for a microscope having the above arrangement. Note that the basic operation of the microscope 1 in transmission bright-field observation is the same as in the first operation example.

As shown in FIG. 1, the white balance detector 39 is connected to the white balance setting unit 49. The white balance setting unit 49 sets a mode in which white balance is corrected automatically following changes in color temperature of the light source, and a mode in which white balance is corrected only when a trigger is input from the operator. In this arrangement, when the operator sets in the white balance setting unit 49 the mode for correcting white balance automatically following changes in color temperature of the light source, the same operation as in the fifth operation example is executed.

When the operator sets in the white balance setting unit 49 the mode for correcting white balance only when a trigger is input from the operator, the operator designates a white portion subjected to white balance detection with the arrow A displayed in the observation image shown in FIG. 2, as described in the fifth operation example. Image data corresponding to the designated white portion is read out from the frame memory 36 to the white balance detector 39 by the memory controller 37. The white balance detector 39 detects white balance based on the image data.

If white balance is good as a result of detection by the white balance detector 39, the gains of the variable gain amplifiers 33*a*, 33*b*, and 33*c* set in the gain setting unit 34 are held without any change. If white balance is lost, the gain settings of the variable gain amplifiers 33*a*, 33*b*, and 33*c* are changed by the gain setting unit 34 to correct white balance. The gains of the variable gain amplifiers 33*a*, 33*b*, and 33*c* are held until the operator inputs a next trigger to the white balance setting unit 49.

After that, if white balance is lost upon changes in color temperature of the light source caused by changing the magnification of the objective lens or light adjusting (dimming) in the microscope 1, the operator designates again a white portion subjected to white balance detection with the arrow A in the observation image shown in FIG. 2. At the same time, the operator inputs a trigger with the white balance setting unit 49 to correct white balance for new observation conditions.

In the sixth operation example, even when a white portion subjected to white balance detection in the observation image displayed on the display unit 48 moves upon movement of a specimen in microscopic observation, the current white balance correction value is held until the operator inputs a next trigger to the white balance setting unit 49. For this reason, the operator can continue observing the specimen under constant white balance.

Figure 9:
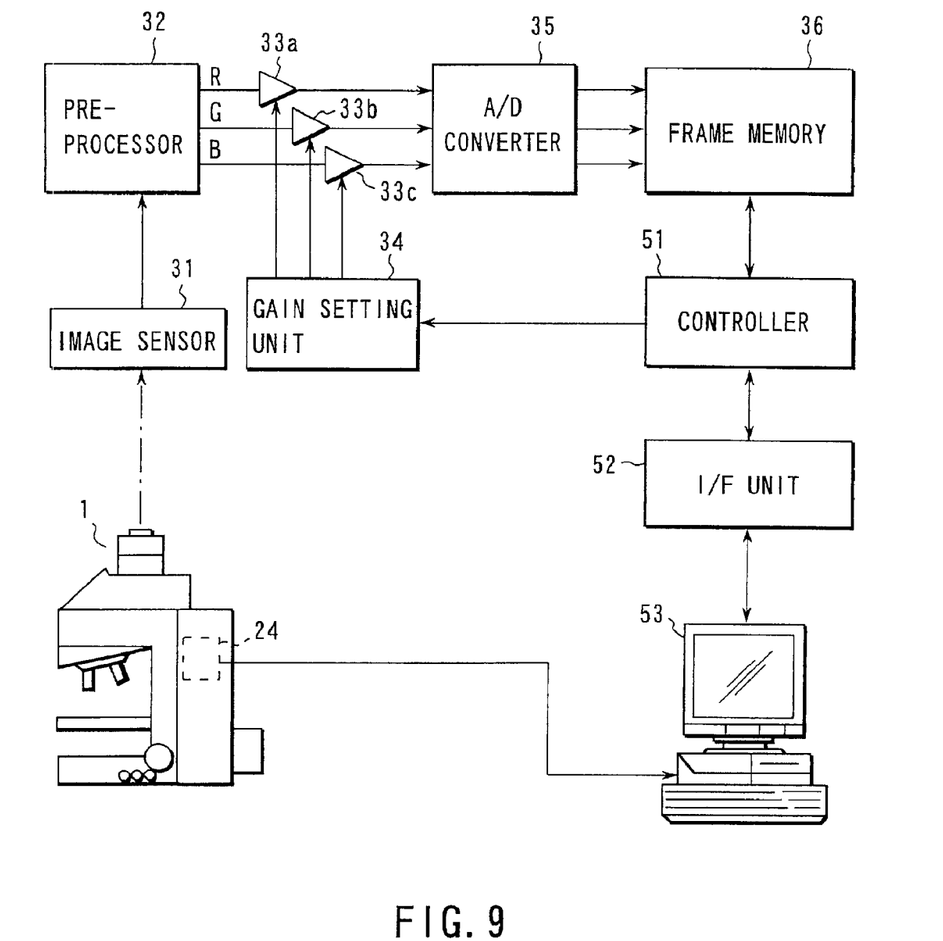
FIG. 9 is a block diagram showing the arrangement of an image sensing apparatus for a microscope according to a second embodiment of the present invention.

FIG. 9 is a block diagram showing the arrangement of an image sensing apparatus for a microscope according to the second embodiment of the present invention. In FIG. 9, the same reference numerals as in FIG. 1 denote the same parts. In the arrangement of FIG. 9, an image sensor 31 is connected to a pre-processor 32, which is connected to a frame memory 36 via variable gain amplifiers 33*a*, 33*b*, and 33*c* and an A/D converter 35. The frame memory 36 is connected to a controller 51. The controller 51 is connected to the variable gain amplifiers 33*a*, 33*b*, and 33*c* via the gain setting unit 34 and to a personal computer (to be referred to as a PC) 53 via an I/F (interface) unit 52. The controller 51 controls the frame memory 36 and the gain setting unit 34. The PC 53 is connected to a microscope controller 24 of a microscope 1.

In the PC 53, a CPU (not shown) performs the processes of a white balance detector 39, color balance adjustment unit 40, chromaticity determination unit 41, tone adjustment unit 44, and luminance distribution determination unit 43 shown in FIG. 1. These processes are executed by the CPU in accordance with respective processing programs stored in the memory (not shown) of the PC 53. The PC 53 incorporates a display processor 46 and D/A converter 47 shown in FIG. 1. A display unit 48 corresponds to the monitor (not shown) of the PC 53. A white balance setting unit 49, position designation unit 38, adjustment amount input unit 42, and adjustment amount input unit 45 shown in FIG. 1 correspond to the keyboard and mouse (not shown) of the PC 53.

In this arrangement, observation image data converted into a digital signal by the A/D converter 35 is stored in the frame memory 36, and input to the PC 53 via the controller 51 and I/F unit 52. The PC 53 displays the observation image on the monitor (not shown). At the same time, the CPU (not shown) controls white balance detection described in the first embodiment, chromaticity determination and color balance adjustment for the pixels of the observation image data, and luminance distribution determination and tone adjustment for the pixels of the observation image data. After white balance is detected, the CPU (not shown) of the PC 53 sets the gains of the variable gain amplifiers 33*a*, 33*b*, and 33*c* in the gain setting unit 34 via the I/F unit 52 and controller 51.

This arrangement can also attain the same effects as in the first embodiment. The arrangement of the first embodiment applies to observation of a moving picture. In the second embodiment, a still image can be stored in the memory (not shown) of the PC 53, and a still observation image can be effectively used.

Figure 10:
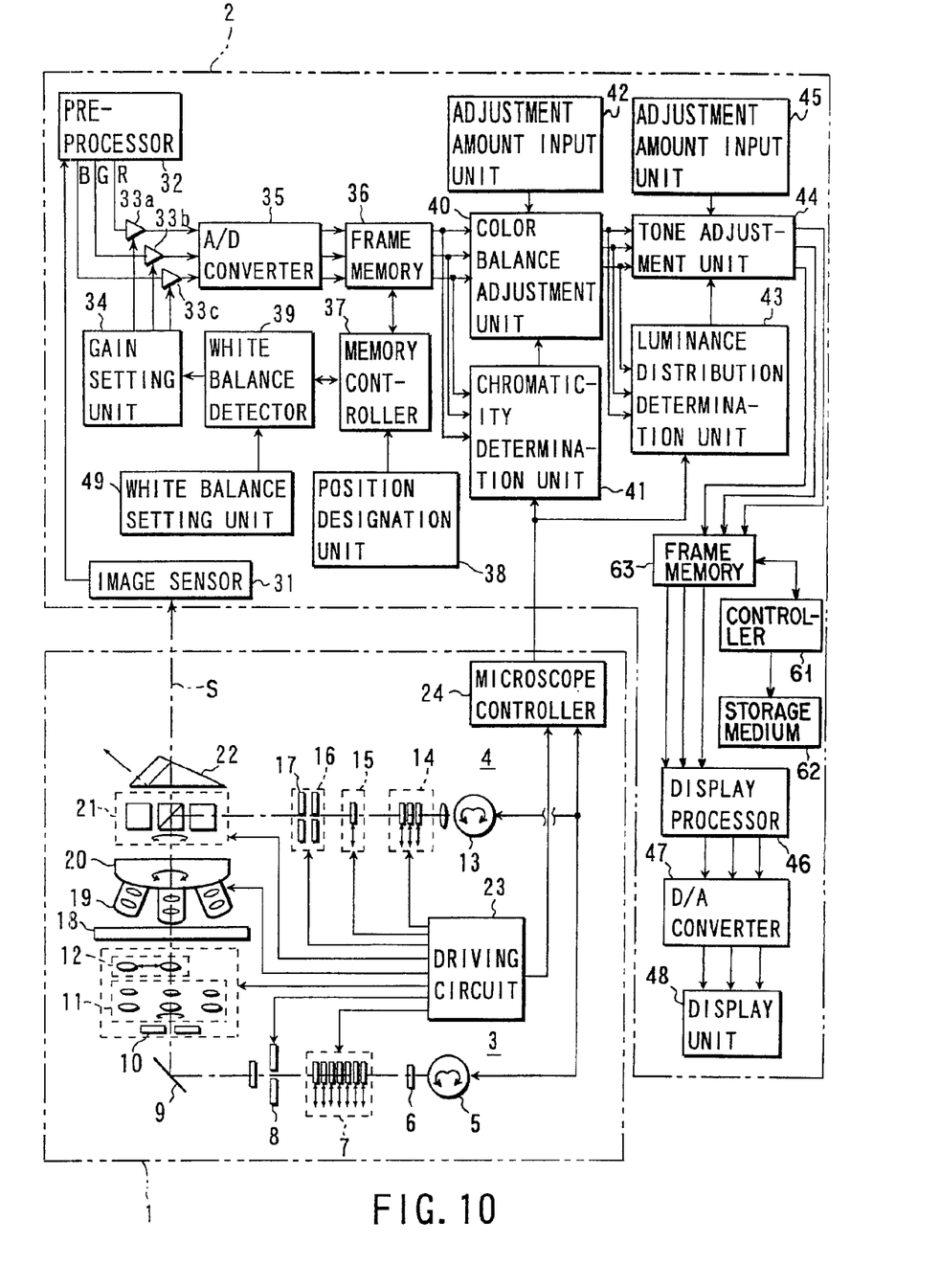
FIG. 10 is a block diagram showing the arrangement of an image sensing apparatus for a microscope according to a third embodiment of the present invention.

FIG. 10 is a block diagram showing the arrangement of an image sensing apparatus for a microscope according to the third embodiment of the present invention. In FIG. 10, the same reference numerals as in FIG. 1 denote the same parts. In the arrangement of FIG. 10, a frame memory 63 is arranged between the tone adjustment unit 44 and the display processor 46, and connected to a storage medium 62 via a controller 61. The storage medium 62 is made of a magnetic disk or the like, and stores respective image data stored in the frame memory 36. The controller 61 outputs to the storage medium 62 a control signal for writing image data of the frame memory 36 as still image data in the storage medium 62, and a control signal for reading out still image data stored in the storage medium 62 to the frame memory 36.

With this arrangement, a moving picture can be observed similar to the arrangement of the first embodiment. In addition, a still image can be stored in the storage medium 62, and a still observation image can be effectively used. That is, the output unit of the image sensing apparatus is the display unit 48 in the first embodiment. However, this output unit can be made of the storage medium 62 to apply the arrangement of the image sensing apparatus to an electronic still camera and the like.

The present invention is not limited to the first to third embodiments, and can be modified as follows. For example, in the first embodiment, the criterion for determining chromaticity or the luminance distribution is set for each microscopy technique. Alternatively, a plurality of criteria may be set based on not only the microscopy technique but also filter information of the microscope, light quantity information, objective information, and the like. The first embodiment has exemplified transmission bright-field observation and fluorescent observation as microscopy techniques. However, in terms of pixel determination corresponding to the microscopy technique, the observation method is not limited to the one described in the first embodiment. The present invention can be applied to various known observation methods such as phase contrast observation.

As has been described above, the present invention can provide an image sensing apparatus for a microscope, which can provide a smooth observation environment corresponding to each microscopy technique without demanding any extra labor of the operator in sensing an observation image obtained from the microscope which can be freely switched to an arbitrary microscopy technique among various microscopy techniques such as transmission bright-field observation and fluorescent observation.

According to the present invention, white balance can be reliably and easily corrected without causing fading of a stained portion or coloring of a white portion in an image even in photographing an image containing many components of specific colors, such as a microscopic specimen, or in photographing when the color temperature of the light source changes upon light adjusting (dimming) for properly setting the observation state of the microscope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing apparatus for a microscope, comprising:

an image sensing unit for sensing an observation image obtained by a microscope and obtaining the observation image;

a microscopy technique determination unit for detecting a microscopy technique in the microscope;

a luminance distribution determination unit for calculating a luminance distribution of the observation image based on the microscopy technique detected by said microscopy technique determination unit, and determining from the luminance distribution a region where tone is to be corrected in the observation image; and a tone adjustment unit for correcting tone in accordance with a tone correction amount arbitrarily set for the region of the observation image determined by said luminance distribution determination unit;

wherein when a fluorescent observation state is detected by the microscopy determination unit:

the luminance distribution determination unit identifies a low-luminance range representing a background and an intermediate-luminance range representing a fluorescent specimen part, from the luminance distribution of the observation image, and determines a boundary between the low-luminance range and the intermediate-luminance range, and the tone adjustment unit performs an arbitrarily set tone correction on the fluorescent specimen part.

2. An image sensing apparatus for a microscope, comprising:

an image sensing unit for sensing a observation image obtained by a microscope and obtaining the observation image;

a microscopy technique determination unit for detecting a microscopy technique in the microscope;

a luminance distribution determination unit for calculating a luminance distribution of the observation image based on the determination unit, and determining from the luminance distribution a region where tone is to be corrected in the observation image; and a tone adjustment unit for correcting tone in accordance with a tone correction amount arbitrarily set for the region of the observation image determined by said luminance distribution determination unit;

wherein when a transmission bright-field observation state is detected by the microscopy technique determination unit:

the luminance distribution determination unit identifies a high-luminance range representing a background and at least one of a low-luminance range and an intermediate-luminance range representing a bright-field specimen part from the luminance distribution of the observation image, and determines a boundary between the high-luminance range and the at least one of the low-luminance range and the intermediate-luminance range, and the tone adjustment unit performs an arbitrarily set tone correction on the bright-field specimen part.

3. The apparatus according to claim 1, wherein the tone adjustment unit performs a tone-expanding correction on the fluorescent specimen part.

4. The apparatus according to claim 2, wherein the tone adjustment unit performs a tone-expanding correction on the bright-field specimen part.

* * * * *